(12) United States Patent
Ruan et al.

(10) Patent No.: US 8,412,809 B2
(45) Date of Patent: Apr. 2, 2013

(54) METHOD, APPARATUS AND COMPUTER PROGRAM PRODUCT IMPLEMENTING MULTI-TENANCY FOR NETWORK MONITORING TOOLS USING VIRTUALIZATION TECHNOLOGY

(75) Inventors: Yaoping Ruan, White Plains, NY (US); Debanjan Saha, Mohegan Lake, NY (US); Sambit Sahu, Hopewell Junction, NY (US); Anees Shaikh, Yorktown Heights, NY (US); Chang-Hao Tsai, Ann Arbor, MI (US)

(73) Assignee: International Business Machines Corporation, Armonk, NY (US)

( * ) Notice: Subject to any disclaimer, the term of this patent is extended or adjusted under 35 U.S.C. 154(b) by 853 days.

(21) Appl. No.: 11/923,018

(22) Filed: Oct. 24, 2007

(65) Prior Publication Data

US 2009/0113031 A1  Apr. 30, 2009

(51) Int. Cl.
*G06F 15/173* (2006.01)
*G06F 7/00* (2006.01)
*H04L 12/28* (2006.01)

(52) U.S. Cl. .................. 709/223; 370/401; 707/759

(58) Field of Classification Search .................. 709/223; 370/401; 707/759
See application file for complete search history.

(56) References Cited

U.S. PATENT DOCUMENTS

| | | | |
|---|---|---|---|
| 6,788,779 B2 | 9/2004 | Ostapchuck | 379/265.02 |
| 6,823,384 B1 | 11/2004 | Wilson et al. | 709/225 |
| 6,831,966 B1 | 12/2004 | Tegan et al. | 379/88.16 |
| 7,079,641 B2 | 7/2006 | Ostapehuck | 379/265.02 |
| 7,082,464 B2 | 7/2006 | Hasan et al. | 709/223 |
| 2003/0007482 A1* | 1/2003 | Khello et al. | 370/352 |
| 2003/0028624 A1* | 2/2003 | Hasan et al. | 709/220 |
| 2003/0135578 A1* | 7/2003 | Banga et al. | 709/215 |
| 2005/0138165 A1* | 6/2005 | Tang et al. | 709/224 |
| 2005/0228852 A1 | 10/2005 | Santos et al. | 709/200 |
| 2005/0232285 A1* | 10/2005 | Terrell et al. | 370/401 |
| 2007/0019568 A1* | 1/2007 | Velupillai | 370/254 |
| 2007/0043860 A1* | 2/2007 | Pabari | 709/224 |
| 2007/0156790 A1* | 7/2007 | Sun Hsu et al. | 707/204 |
| 2008/0222123 A1* | 9/2008 | Colby et al. | 707/4 |

OTHER PUBLICATIONS

Padala et al., "Performance Evaluation of Virtualization Technologies for Server Consolidation", Apr. 2007, Hewlett Packard, p. 1-15.*
Paul Barham, Boris Dragovic, Keir Fraser, Steven Hand, Tim Harris, Alex Ho, Rolf Neugebauer, Ian Pratt, and Andrew Warfield. 2003. Xen and the art of virtualization. In Proceedings of the nineteenth ACM symposium on Operating systems principles (SOSP '03). ACM, New York, NY, USA, 164-177.*
Raouf Boutaba, Walfrey Ng, and Alberto Leon-Garcia. 2001. Web-Based Customer Management of VPNs. J. Netw. Syst. Manage. 9, 1 (Mar. 2001), 67-87.*

* cited by examiner

*Primary Examiner* — Lynn Feild
*Assistant Examiner* — Taylor Elfervig
(74) *Attorney, Agent, or Firm* — Harrington & Smith

(57) ABSTRACT

Method, apparatus and computer program product manage a plurality of networks with a single tenant network management tool using virtualization and implement control plane virtualization of the single tenant management tool; data storage virtualization of a data storage apparatus and network address virtualization of an available address range. A virtual machine may be implemented for each network of the plurality of networks to contain an instance of the single tenant management tool. In one implementation, a proxy is used to implement data storage virtualization. In another implementation, separate data storage is maintained for each network and data storage virtualization is achieved by managing the network protocol stack virtualization. The network address virtualization may be implemented using machine-level virtualization or operating-system-level virtualization.

23 Claims, 4 Drawing Sheets

METHOD, APPARATUS AND COMPUTER PROGRAM PRODUCT IMPLEMENTING MULTI-TENANCY FOR NETWORK MONITORING TOOLS USING VIRTUALIZATION TECHNOLOGY

TECHNICAL FIELD

The invention generally concerns network management tools and more particularly concerns network management tools implemented with virtualization technology.

BACKGROUND

As a service provider looks for new ways to achieve high quality and cost efficiency in the way they manage IT infrastructure for customers, an important emerging theme is the need to adopt a standard set of management tools and processes. This goal is complicated by the complex variety of customer environments and requirements, as well as the increasingly systems and networks located across the globe.

One recent strategy being pursued by IT service providers to address this challenge is to deploy a relatively small set of "best-of-breed" management tools that support multi-tenancy, i.e., single instance can support multiple customers. Multi-tenant tools have a number of important advantages in terms of cost and simplicity. They require deployment of a much smaller infrastructure, in contrast to having a dedicated installation for each customer, which can significantly reduce costs for the infrastructure hosting the tool itself. Moreover, in some cases, multi-tenant tools have more advantageous software licensing models, for example, with a single license used to manage multiple customers. Finally, multi-tenant tools are a crucial element of the higher-level goal of consolidating tools to reduce training, management and support costs.

A major barrier to adopting multi-tenant tools is that the desired management tool may not be designed for multiple customer environments. It usually requires significant effort to rewrite the tool in order to provide the needed support. Full multi-tenant support requires adequate, auditable protection against the risk of data leakage between customers. Performance of each tenant should meet the level provided in a single tenant case.

The prior art has shown no appreciation for the need to provide multi-tenancy capability in management software using virtualization technologies.

SUMMARY OF THE INVENTION

A first embodiment of the invention is a system comprising multi-tenant network management apparatus configured to manage a plurality of networks with a single tenant network management tool using virtualization, where the multi-tenant management apparatus implements control plane virtualization of the single tenant management tool; data storage virtualization of a data storage apparatus and network address virtualization of an available address range.

A second embodiment of the invention is a computer program product comprising a computer readable memory medium storing a computer program, the computer program configured to be executed by a computer processing apparatus of a multi-tenant network management system, wherein when the computer program is executed by the computer processing apparatus operations are performed by the multi-tenant network management system, the operations comprising: managing a plurality of networks with a single-tenant management tool using virtualization; and implementing control plane virtualization of the single management tool; data storage virtualization of a data storage apparatus and network address virtualization of an available address range.

A third embodiment of the invention is a method comprising: managing a plurality of networks with a single-tenant management tool using virtualization; and when managing the plurality of networks, implementing control plane virtualization of the single management tool; data storage virtualization of a data storage apparatus and network address virtualization of an available address range.

In conclusion, the foregoing summary of the embodiments of the present invention is exemplary and non-limiting. For example, one of ordinary skill in the art will understand that one or more aspects or operations from one embodiment can be combined with one or more aspects or operations from another embodiment to create a new embodiment within the scope of the invention.

BRIEF DESCRIPTION OF THE DRAWINGS

The foregoing and other aspects of these teachings are made more evident in the following Detailed Description of the Invention, when read in conjunction with the attached Drawing Figures, wherein.

DETAILED DESCRIPTION OF THE INVENTION

The invention provides a method and apparatus to enable multi-tenancy capability for management software without any modification to the source code of the management software by using virtualization technology. The system utilizes multiple levels of virtualization including a virtualized back-end which contains individual copies of the management software; a Virtual Private Network (VPN) connection between the management tenant and the network it manages; a virtualized data storage partition such as a database; and a virtualized front-end interface to support multiple tenant access to the management functionalities.

Multi-tenancy allows an administrator to monitor multiple customer infrastructures using a single instance of a monitoring tool. The advantage of this model is reduced overhead for installing separate tools for each customer, reduced cost for licensing and reduced maintenance fees etc. However most of the existing tools are designed for single tenancy architecture that allows only single customer infrastructure to be monitored. There have been attempts to convert single tenant tools to multi-tenant capability. Some of the attempts involved rewriting a substantial part of the original code or complete redesign of the tool architecture. The invention provides a method to enable multi-tenancy for network monitoring tools using virtualization. An advantage of the invention is that it requires almost no or little modification to existing tool code.

Figure 1:
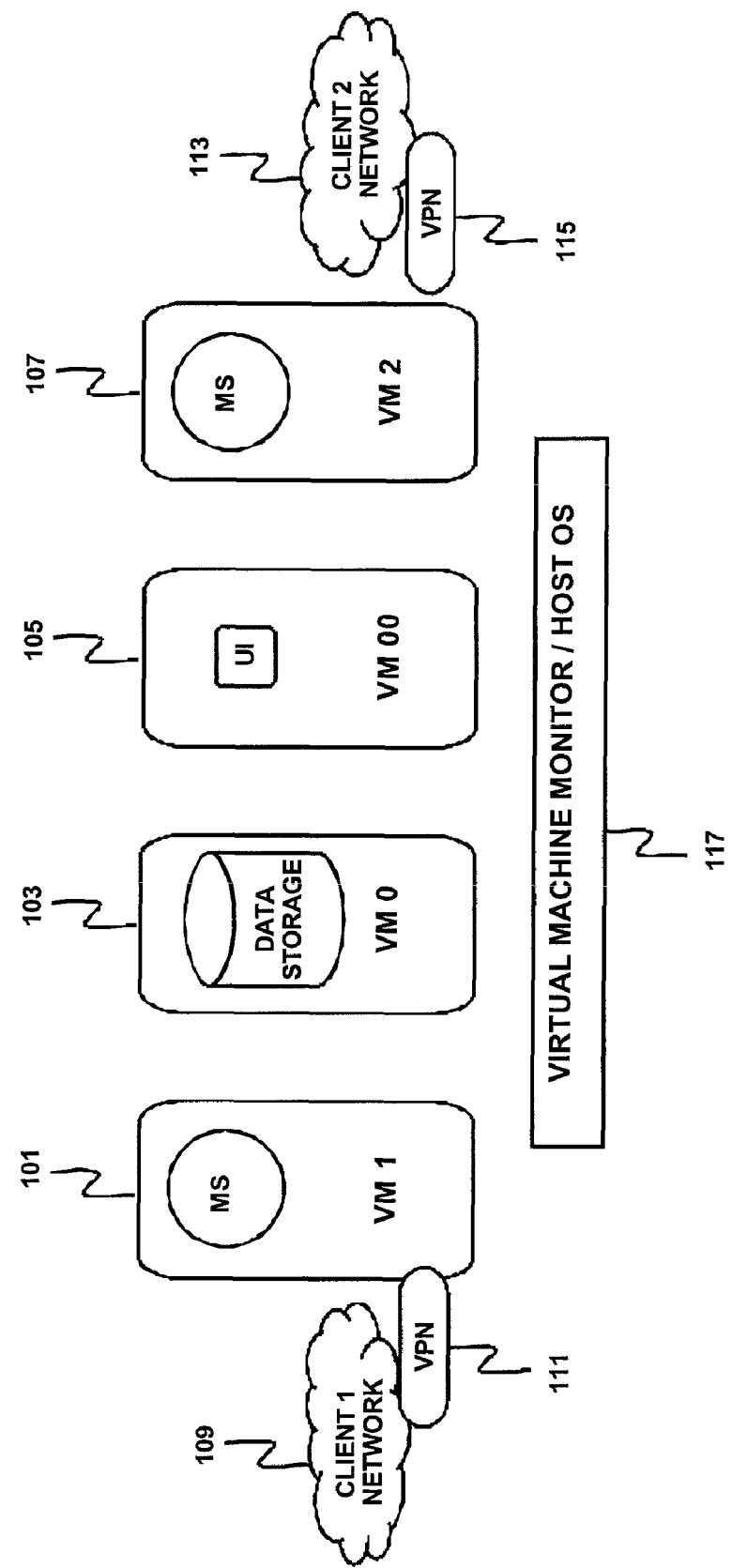
FIG. 1 is a block diagram depicting a system in accordance with the invention.

FIG.1 is a block diagram depicting a system 100 configured in accordance with the invention comprising virtual machines 101, 103, 105 and 107 established by a multi-tenant network management system also operating in accordance with the invention. Instances of single tenant management tools are implemented, respectively, in virtual machines VM 1 101 and VM 2 107. The instances of the single tenant management tools implemented in virtual machines VM 1 101 and VM 2 107 communicate, respectively, with their managed network domains client network 1 109 and client network 2 113 through virtual private networks ("VPN") 111 and 115, respectively. Instances of data storage control apparatus and user interface control apparatus are respectively implemented in virtual machines VM 0 103 and VM 00 105. The multi-tenant network management system is implemented by virtual machine monitor / host operating system 117.

Figure 2:
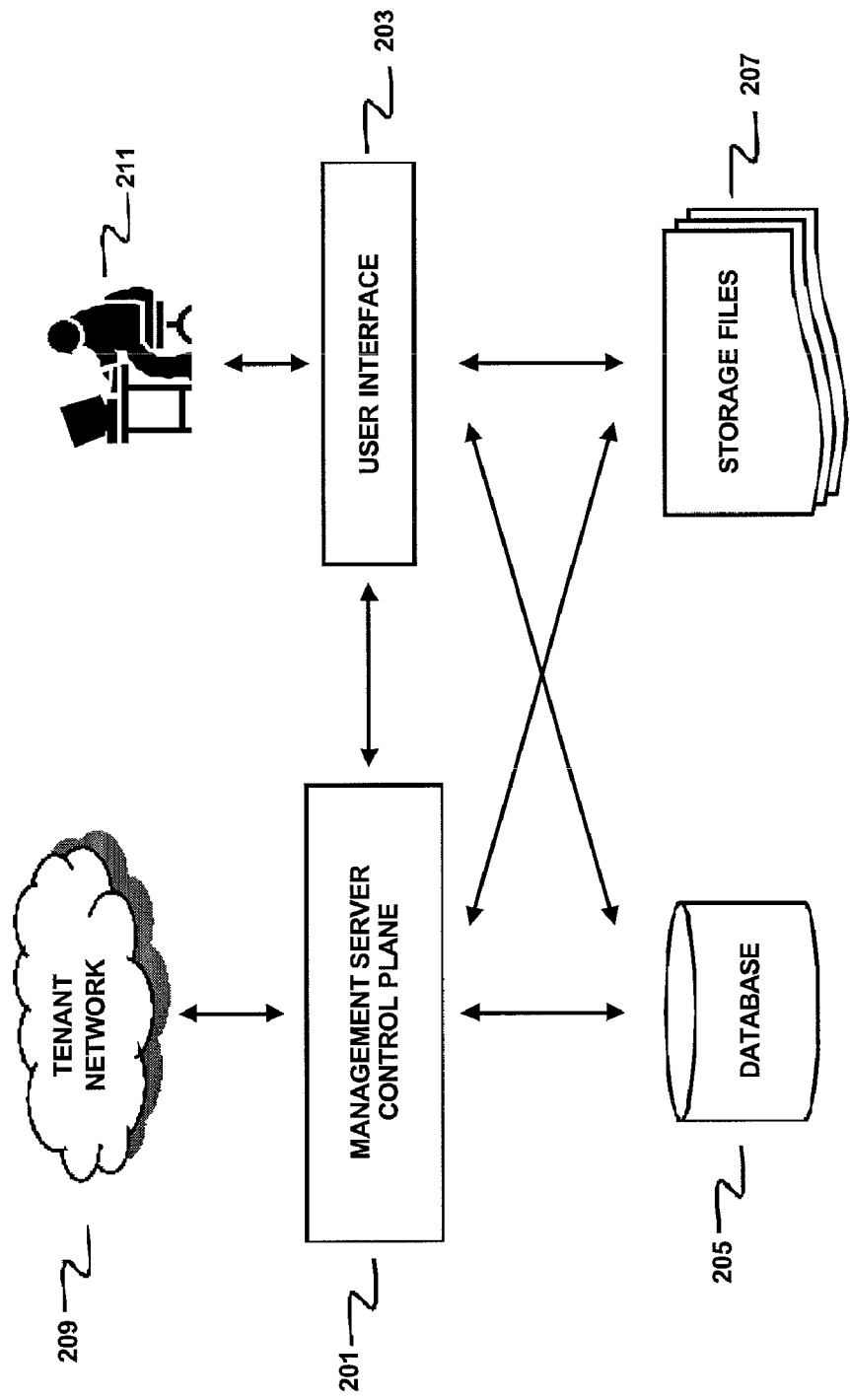
FIG. 2 is a block diagram depicting components comprising a system configured in accordance with the invention.

FIG. 2 is a block diagram depicting components that operate in combination to provide the virtualization functions of the invention. A user 211 performs control operations through a user interface 203 associated with an instance of a single tenant network management tool implemented in a virtual machine (not shown) in the manner depicted in FIG. 1. The user interface 203 communicates with the backend management server control plane 201 to perform management operations on the tenant network 209. Typically, management operations use, operate on or collect information that is stored in database 205 and storage files 207.

A multi-tenant network management system configured in accordance with the invention comprises at least three components: (i) data storage virtualization to enable data storage from multiple tenants; (ii) control plane virtualization for redirecting user requests to proper user interface modules; and (iii) network address virtualization to support the same address range for multiple tenant networks. Embodiments of the invention implement each of these aspects.

An embodiment of the invention implements control plane virtualization by hosting per client instances of single client network management tools in separate VM instances. The multi-tenant network management system is configured to receive user requests; to determine the target virtual machine for each of the user requests; and to direct each user request to the correct target virtual machine so that the user request can be operated on by an instance of a single-tenant network management tool implemented in the virtual machine. A beneficial aspect of implementing control plane modules in separate VMs is the minimization of modification of the original single tenant network management tool. This, however, is an exemplary embodiment and other implementations of control plane virtualization are encompassed by the invention.

Figure 3:
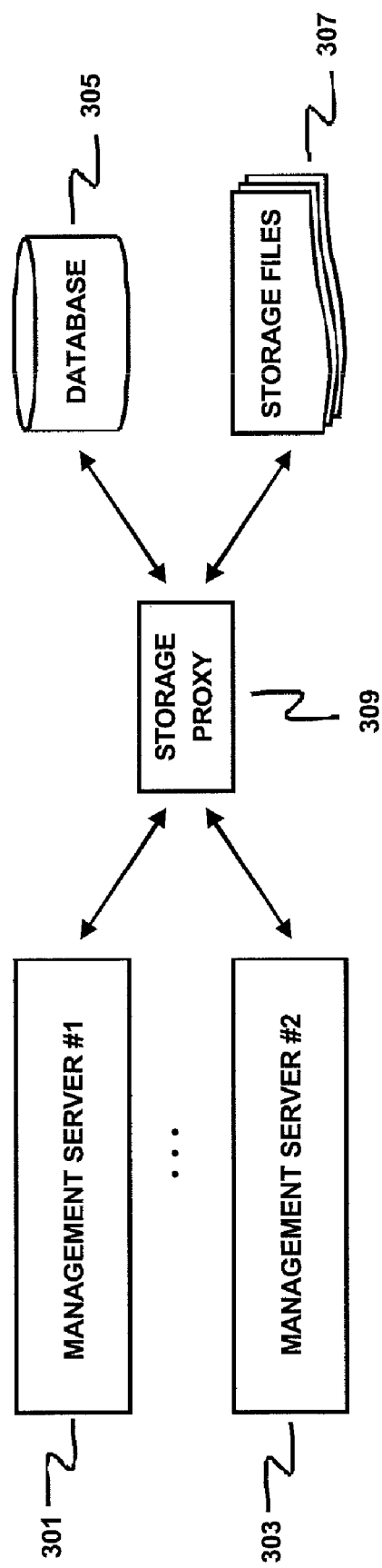
FIG. 3 is a block diagram depicting a data storage virtualization arrangement using a proxy in accordance with the invention.
Figure 4:
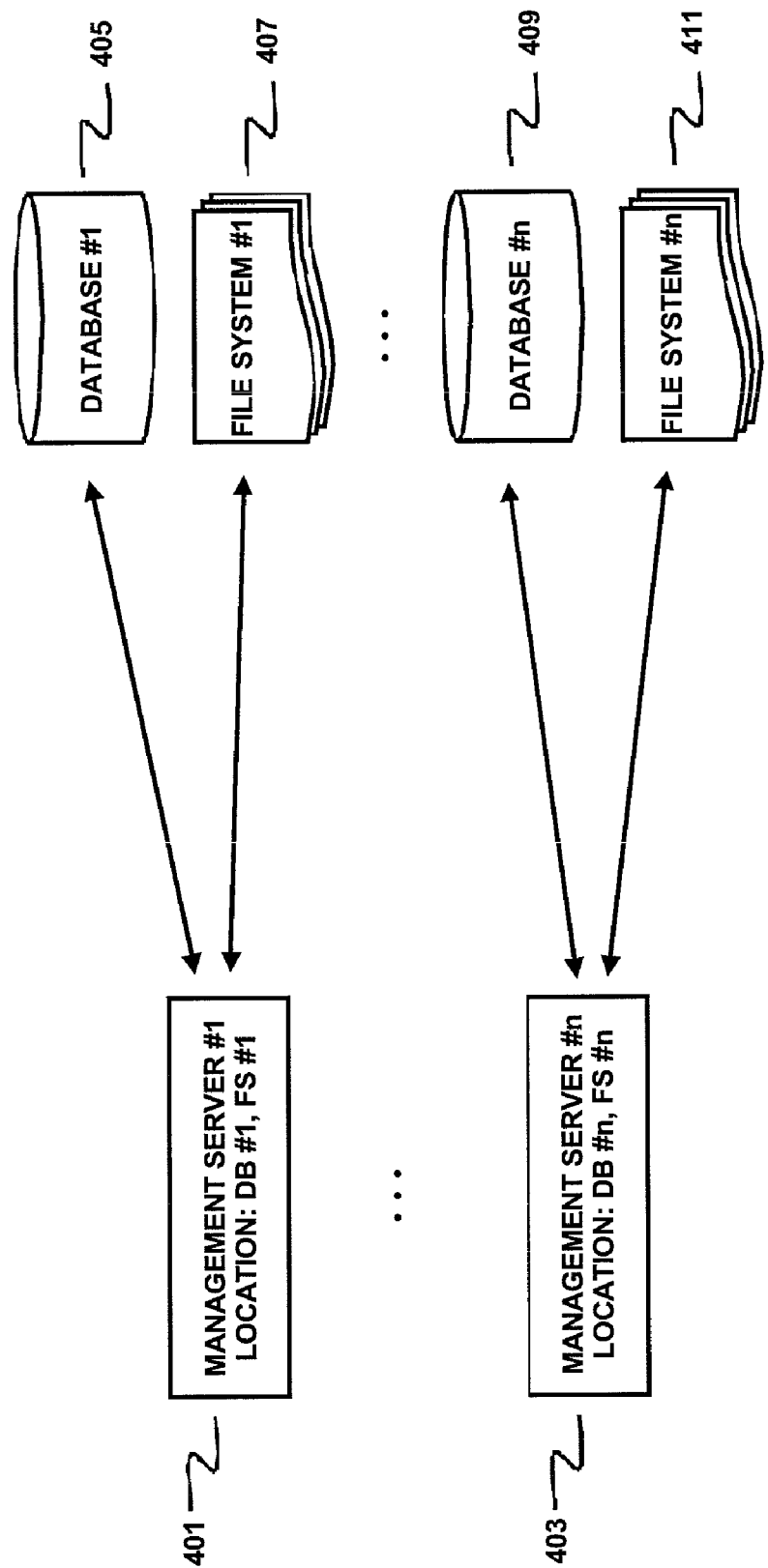
FIG. 4 is a block diagram depicting another data storage virtualization arrangement in accordance with the invention.

FIGS. 3 and 4 depict two alternate embodiments for implementing data storage virtualization that require minimal modification to existing single tenant network management tools. A first embodiment depicted in FIG. 3 uses a proxy 309 that handles all queries and updates before they are committed to storage in database 305 and storage files 307. The storage can be a database of a plain file system. The proxy 309 provides customer context such as a customer identifier. In the case of the database 305, the proxy 309 rewrites SQL queries with customer information so that the same table can be used for handling data queries from multiple management servers 301, 303.

To describe this aspect in greater detail, database virtualization is achieved by rewriting SQL queries. The network management system issues SQL queries to a database system (DB) to store and retrieve data. When two or more network management systems are configured to store data in a single DB there can be a conflict in conventional systems between DB user names, table names, or data entries. This is avoided in an aspect of the invention by re-writing SQL queries. The collision of user name and table name can be avoided by pre-fixing or post-fixing a unique ID which identifies a particular network management system. Similarly, data entry collisions are avoided in aspects of the invention by assigning each data entry a unique ID. A SQL proxy is built to rewrite SQL queries and network management systems issue SQL queries to the proxy instead of to the DB itself so the SQL proxy examines and rewrites the query appropriately. The proxy uses a set of rules to decide if a SQL query needs to be rewritten and how to rewrite the query. The proxy can identify a network management system using information in packet headers, such as source IP address, source port number, or destination port number. It can also use the credentials that a network management system presents to the DB to identify a network management system. Each rewriting rule comprises two parts—matching expression and modification rule. The matching expression uses regular expression to allow rapid development and is also easier to adapt with different network management systems. The modification rule uses the matching substrings produced by the matching rules to produce the output string.

A second embodiment depicted in FIG. 4 maintains separate storage for each management server 401, 403. As is depicted a database 405 and file system 407 are maintained for management server 401, and a database 409 and file system 411 are maintained for management server 403. In this embodiment the multi-tenant network management system finds the correct database or file system and performs the appropriate read/write operations to the correct storage.

The last feature involves virtualization of network address space to support same address ranges among a plurality of clients. Many networks use private Internet address ranges in internal servers to improve security and reduce the use of limited public Internet addresses. Those private IP address assignments are unique within the internal network and hence do not cause a problem. However, using one system to monitor multiple such networks in convention systems is difficult, because IP addresses are not unique. For example, assume Network A and Network B both use the IP address range 192.168.1.0/24 for their internal servers. If one simply connects a computer to both networks using two (physical) network interface cards, a packet addressed to 192.168.1.1 cannot be routed correctly, as two different routes to the same network address range are present in the system but only one can be taken.

In an embodiment implementing this aspect of the invention a separate VPN connection is established for the front end corresponding to each client address. This enables the multi-tenant network management system of the invention to monitor the same network address range within a client address space transparently using the appropriate VPN connection. This is accomplished by virtualizing the network address space. Virtual machine technology, such as Xen (machine-level virtualization) or OpenVZ (OS-level virtualization) is used to create multiple routing tables in one system. Inside each virtual machine, a VPN is created and connected to a network. In this configuration in accordance with the invention, each VM can monitor a different network and packets can be correctly routed. In the previous example of Network A and Network B the invention provides a solution by creating two VMs. VM A uses a VPN connection to connect to network A so the hosts in private address ranges in Network A can be addressable in VM A. VM B connects to network B using a similar arrangement. By utilizing this configuration, one can manage multiple networks with conflicting address ranges in one computer system.

To reiterate, in embodiments of the invention network address virtualization is achieved by using network protocol stack virtualization and having separate independent VPN connections in each virtualized network. Network protocol stack virtualization can be provided by machine-level virtualization (such as Xen, or VMware) or OS-level virtualization that specifically support this feature (such as Virtuozzo or OpenVZ). Within each virtualized network protocol stack, a Layer-2 VPN connection to a client network is created. The private internet address ranges that the client uses then become visible only to the scope of the network protocol stack and the processes using the network protocol stack. An example is of this arrangement is depicted in FIG. 1.

Thus it is seen that the foregoing description has provided by way of exemplary and non-limiting examples a full and informative description of the best methods and apparatus presently contemplated by the inventors for enabling multi-tenancy for network monitoring tools using virtualization technology. One skilled in the art will appreciate that the various embodiments described herein can be practiced individually; in combination with one or more embodiments described herein; or in combination with systems differing from those described herein. Further, one skilled in the art will appreciate that the invention can be practiced by other than the described embodiments; that these described embodiments are presented for the purposes of illustration and not of limitation; and that the present invention is therefore limited only by the claims which follow.

We claim:

1. A system comprising:
a data storage apparatus; and
a computer processing apparatus comprising a memory storing a computer program, and at least one processor, the at least one processor configured by execution of the computer program to cause the computer processing apparatus to manage a plurality of networks using virtualization at least by: instantiating an instance of a single tenant network management tool in a separate virtual machine for each network of the plurality of networks; performing data storage virtualization of a data storage apparatus, the data storage virtualization providing at least data storage into a database on the data storage apparatus for multiple tenants, each tenant corresponding to one of the plurality of networks; performing network address virtualization of an available private address range for each of the plurality of networks, wherein multiple tenants may have conflicting private address ranges on their corresponding networks; directing user requests associated with a specific network to a selected virtual machine corresponding to that specific network; causing the instance of the single tenant network management tool corresponding to the selected virtual machine to operate on the user request; and directing database queries from the plurality of networks into the database by examining the database queries according to a set of rules and rewriting those database queries that need to be rewritten according to the set of rules so that each database query from each network of the plurality of networks has a unique identification referencing a network management system of the network and conflicts are avoided between data stored into the database from the plurality of networks.

2. The system of claim 1 wherein the at least one processor is further configured by execution of the computer program to cause the computer processing apparatus to use a proxy to the implement data storage virtualization and the rewriting those database queries that need to be rewritten according to the set of rules.

3. The system of claim 2 where the database has an address table and wherein the proxy is further configured to rewrite structured query language queries with customer information so that the database can be used to handle data and queries from multiple customers.

4. The system of claim 1 where the data storage apparatus further comprises separate data storage for each network and wherein the at least one processor is further configured by execution of the computer program to cause the apparatus to implement data storage virtualization by managing the separate data storage for each network.

5. The system of claim 4 where the data storage apparatus is further configured to receive data operation requests from each network of the plurality of networks; to identify a target data storage for each received data operation request; and to perform the read or write operation specified by the data operation request using the target data storage.

6. The system of claim 1 where the at least one processor is further configured by execution of the computer program to cause the computer processing apparatus to implement the network address virtualization by using network protocol stack virtualization.

7. The system of claim 6 where the network protocol stack virtualization is implemented using machine-level virtualization.

8. The system of claim 6 where the network protocol stack virtualization is implemented using operating-system-level virtualization.

9. The system of claim 6 where the at least one processor is further configured by execution of the computer program to cause the computer processing apparatus to establish a virtual private network connection for each network of the plurality of networks, wherein private address ranges that a tenant uses within a corresponding network are visible only to the scope of the network protocol stack, where the virtual private network connection and the network protocol stack perform the network address virtualization.

10. The system of claim 1 wherein rewriting those database queries that need to be rewritten according to the set of rules further comprises, to those database queries that need to be rewritten according to the set of rules, affixing a unique identification to names in queries, each unique identification uniquely identifying one of the plurality of networks.

11. A computer program product comprising a non-transitory computer readable memory medium storing a computer program, the computer program configured to be executed by a computer processing apparatus, wherein when the computer program is executed by the computer processing apparatus the computer processing apparatus is configured to manage a plurality of networks using virtualization at least by: instantiating an instance of a single tenant network management tool in a separate virtual machine for each network of the plurality of networks; performing data storage virtualization of a data storage apparatus coupled to the computer processing apparatus, the data storage virtualization providing at least data storage into a database on the data storage apparatus for multiple tenants; performing network address virtualization of an available private address range for each of the plurality of networks, wherein multiple tenants may have conflicting private address ranges on their corresponding networks; directing user requests associated with a specific network to a selected virtual machine corresponding to that specific network; causing the instance of the single tenant network management tool corresponding to the selected virtual machine to operate on the user request; and directing database queries from the plurality of networks into the database by examining the database queries according to a set of rules and rewriting those database queries that need to be rewritten according to the set of rules so that each database query from each network of the plurality of networks has a unique identification referencing a network management system of the network and conflicts are avoided between data stored into the database from the plurality of networks.

12. The computer program product of claim 11 wherein the computer program, when executed, is further configured to cause the computer processing apparatus to rewrite structured query language queries with customer information so that the database can be used to handle data and queries from multiple customers.

13. The computer program product of claim 11 where the data storage apparatus further comprises separate data storage for each network and wherein the computer program, when executed, is further configured to cause the computer processing apparatus to implement data storage virtualization by managing the separate data storage for each network.

14. The computer program product of claim 11 wherein when the computer program, when executed, is further configured to cause the computer processing apparatus to implement network address virtualization by using network protocol stack virtualization.

15. The computer program product of claim 14 wherein the network protocol stack virtualization is implemented using machine-level virtualization.

16. The computer program product of claim 14 where the network protocol stack virtualization is implemented using operating-system-level virtualization.

17. The computer program product of claim 11, wherein rewriting those database queries that need to be rewritten according to the set of rules further comprises, to those database queries that need to be rewritten according to the set of rules, affixing a unique identification to names in queries, each unique identification uniquely identifying one of the plurality of networks.

18. A method comprising:
managing, by a computer processing apparatus, a plurality of networks using virtualization by performing at least the following:
instantiating, by the computer processing apparatus, an instance of a single tenant network management tool in a separate virtual machine for each network of the plurality of networks;
performing, by the computer processing apparatus, data storage virtualization of a data storage apparatus coupled to the computer processing apparatus, the data storage virtualization providing at least data storage into a database on the data storage apparatus for multiple tenants, each tenant corresponding to one of the plurality of networks;
performing network address virtualization of an available private address range for each of the plurality of networks, wherein multiple tenants may have conflicting private address ranges on their corresponding networks;
directing user requests associated with a specific network to a selected virtual machine corresponding to that specific network;
causing the instance of the single tenant network management tool corresponding to the selected virtual machine to operate on the user request; and
directing database queries from the plurality of networks into the database by examining the database queries according to a set of rules and rewriting those database queries that need to be rewritten according to the set of rules so that each database query from each network of the plurality of networks has a unique identification referencing a network management system of the network and conflicts are avoided between data stored into the database from the plurality of networks.

19. The method of claim 18, wherein rewriting those database queries that need to be rewritten according to the set of rules further comprises, to those database queries that need to be rewritten according to the set of rules, affixing a unique identification to names in queries, each unique identification uniquely identifying one of the plurality of networks.

20. The method of claim 18, wherein rewriting those database queries that need to be rewritten according to the set of rules are rewritten so that each database query has the unique identification to avoid conflicts of at least one of a user name, a table name and a data entry received from two or more networks of the plurality of networks.

21. The method of claim 18, wherein rewriting those database queries that need to be rewritten according to the set of rules are rewritten so that each database query has the unique identification to avoid conflicts of a user name received from two or more networks of the plurality of networks.

22. The method of claim 18, wherein rewriting those database queries that need to be rewritten according to the set of rules are rewritten so that each database query has the unique identification to avoid conflicts of a table name received from two or more networks of the plurality of networks.

23. The method of claim 18, wherein rewriting those database queries that need to be rewritten according to the set of rules are rewritten so that each database query has the unique identification to avoid conflicts of a data entry received from two or more networks of the plurality of networks.

* * * * *